United States Patent Office 3,642,670
Patented Feb. 15, 1972

3,642,670
CATIONIC SILICONE SURFACTANTS FOR FLEXIBLE POLYESTER URETHANE FOAMS
Bernard Kanner, West Nyack, and Bela Prokai, Mahopac, N.Y., assignors to Union Carbide Corporation, New York, N.Y.
No Drawing. Filed Dec. 22, 1969, Ser. No. 887,429
Int. Cl. C08g 22/44, 51/00
U.S. Cl. 260—2.5 AH        11 Claims

ABSTRACT OF THE DISCLOSURE

The production of flexible polyester urethane foams using as stabilizing agents cationic silicone surfactants having the formula:

$$MD_xM \qquad (a)$$

wherein M is the trimethylsiloxy unit, $Me_3SiO_{1/2}$, $x$ is an integer of 1 to 3, and D is a cationic difunctional siloxy unit of the formula:

$$X^- [R_3 \overset{+}{N} R^\circ Si(Me)O] \qquad (1)$$

wherein R° is a divalent organic having 2 to 18 carbon atoms and selected from the class consisting of divalent hydrocarbon groups, hydroxy-substituted divalent hydrocarbon groups and —R″OR″— groups wherein R″ is selected from the class consisting of divalent hydrocarbon groups and hydroxy-substituted divalent hydrocarbon groups and may be the same or different in each occurrence; R is selected from the class consisting of a monovalent hydrocarbon group when taken individually, and, when two R groups are taken together with N of said formula, a divalent group containing a five to six member heterocyclic ring in which N is bonded to the remaining R group and said R° group which is selected from the class consisting of hydroxy-substituted divalent hydrocarbon groups and said —R″OR″— groups; and X is an inorganic anion. The cationic silicone surfactants permit the production of flexible polyester urethane foams having fine, uniform cell structure, low compression set and freedom from large voids and splits.

---

This invention relates to novel processes for producing flexible polyester urethane foams using cationic silicone surfactants as foam stabilizing agents.

Flexible polyester urethane foams are conventionally produced by reacting a polyester containing hydroxyl groups and polyisocyanates in the presence of blowing agents, amine catalysts and organic surfactants (e.g., amides and sulfates of esters). The surfactants are called "emulsifiers" and serve to stabilize the foam. By such processes it is difficult to produce relatively low density foams (e.g., foams having densities less than about 2.0 pounds per cubic foot) or high density foams (e.g., foams having densities greater than about 4.0 pounds per cubic foot) which possess fine uniform cell structure. These difficulties in producing low and high density foams appear to be attributable, at least in part, to the emulsifiers employed.

Attempts to replace organic surfactants with silicone surfactants have been suggested. For example, U.S.P. 3,278,465 discloses the use of cationic silicones in the production of urethane foams from polyether polyols. However, when it is attempted to use the specific cationic silicone compounds disclosed in this patent to produce polyester urethane foams, it is found that unavoidable foam collapse occurs or very low grade foams result.

This invention is based, in part, on the discovery that the above-described difficulties in producing flexible polyester urethane foams can be overcome by employing certain cationic silicone surfactants as foam stabilizers during the production of the foams.

More particularly, this invention provides a process for producing flexible polyester urethane foams, which comprises foaming and reacting, in a single step, a reaction mixture comprising:

(I) A polyester resin having an average of at least two hydroxyl groups per molecule and having a hydroxyl number of from 45 to 150;

(II) A polyisocyanate, said polyester and said polyisocyanate, taken together, being present in the mixture in a major amount and in the relative amount required to produce the urethane;

(III) A blowing agent in a minor amount sufficient to foam the reaction mixture;

(IV) A catalytic amount of a catalyst for the protection of the urethane from the polyester and the polyisocyanate;

(V) A minor amount of a cationic silicone surfactant of the formula:

$$MD_xM \qquad (a)$$

wherein M is the trimethylsiloxy unit, $Me_3SiO_{1/2}$, $x$ is an integer of 1 to 3, and D is a cationic difunctional siloxy unit of the formula:

$$X^- [R_3 \overset{+}{N} R^\circ Si(Me)O] \qquad (1)$$

wherein R° is a divalent organic group having 2 to 18 carbon atoms and selected from the class consisting of divalent hydrocarbon groups, hydroxy-substituted divalent hydrocarbon groups, and —R″OR″— groups wherein R″ is selected from the class consisting of divalent hydrocarbon groups and hydroxy-substituted divalent hydrocarbon groups and may be the same or different in each occurrence; R is selected from the class consisting of a monovalent hydrocarbon group, preferably having 1 to 18 carbon atoms, when taken individually, and, when two R groups are taken together with N of said formula, a divalent group containing a five to six member heterocyclic ring in which N is bonded to the remaining R group and R° group which is selected from the class consisting of hydroxy-substituted divalent hydrocarbon groups and said —R″OR″— groups; and X is an inorganic anion such as iodine, bromine, chlorine, aryl sulfonate having 6 to 18 carbon atoms, e.g., benzene sulfonate, toluene sulfonate and the like, nitrate, nitrite or borate, when taken individually; sulfate or sulfite when two X groups are taken together; or phosphate when three X groups are taken together. Preferably, X is iodine, bromine or chlorine.

Preferred cationic silicone surfactants are those having the formula:

$$[(Me_3SiO)_2Si(Me)R^\circ \overset{+}{N} R_3]X^-$$

wherein R, R° and X are as defined above.

Illustrative of the monovalent hydrocarbon groups that are represented by R when taken individually in Formula 1 are the alkyl groups (for example, the methyl, ethyl, isopropyl, n-butyl, n-hexyl, n-octyl, n-decyl and n-dodecyl groups), the aryl groups (for example, the phenyl and naphthyl groups); the aralkyl groups (for example, the benzyl and the phenylethyl groups); the alkaryl groups (for example, the tolyl and n-hexylphenyl groups), and the cycloalkyl groups (for example, the cyclopentyl and cyclohexyl groups). Such groups preferably contain 1 to 18, more preferably 1 to 12, carbon atoms. If desired, such groups can contain substituents such as halogens and the like. The alkyl groups are preferred. Two R groups and the N atom of Formula 1 can be taken together to comprise a morpholinium group $>\overset{+}{N}(CH_2CH_2)_2O$ or a piperidinium group $>\overset{+}{N}C_5H_{10}$, the pyrrolium group, the piperazinium group, and the like.

Illustrative of the divalent groups represented by R° in Formula 1 are the alkylene groups (such as, the ethylene, 1,2-propylene, 1,3-propylene, butylene, 2,2-dimethyl-1,3-propylene, 1,6-hexylene, 1,6-(2 - ethyl)hexylene, 1,12-dodecylene and decylene groups), the arylene groups (such as the phenylene and p,p'-diphenylene groups), the alkarylene groups (such as the phenylethylene group) and their hydroxy-substituted derivatives.

Illustrative of the —R″OR″— groups represented by R° in Formula 1 are 1,3-propyleneoxyethylene, 1,3-propyleneoxy-1,3-propylene, 1,3 - propyleneoxy-1,4-butylene, 1,3-propyleneoxy - 1,3 - butylene, 1,3-propyleneoxy-2-hydroxy-1,3-propylene, and any divalent group of the formula —R″OR″— in which R″ is any of the divalent hydrocarbon groups listed above.

Preferably, the divalent hydrocarbon group contains 2 to 18 carbon atoms and most preferably is an alkylene group containing from 2 to 8 carbon atoms, an alkyleneoxyalkylene group having 4 to 12 carbon atoms or a hydroxy-substituted alkyleneoxyalkylene group having 4 to 12 carbon atoms.

The cationic silicone surfactants are prepared by the platinum-catalyzed addition of a hydrosiloxane to alkenyl amines, e.g., tertiary allyl amines, followed by reaction with a hydrocarbyl halide, e.g., methyl iodide, as for example:

$[R_3'SiO]_2Si(R')H + CH_2=CHCH_2N(CH_2CH_2)_2O$

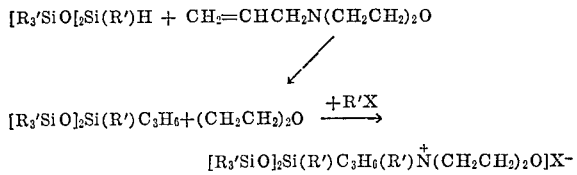

$[R_3'SiO]_2Si(R')C_3H_6\overset{+}{N}(R')(CH_2CH_2)_2O]X^-$

These reactions are readily carried out by mixing the initial reactants together with the catalyst and heating to elevated temperature, e.g., about 100° C. to 200° C., under a nitrogen blanket. Completion of the initial reaction is determined by testing with AgNO₃ for any remaining hydrosiloxane. After completion the reaction mixture is cooled and, if need be, neutralized with sodium bicarbonate. The resulting reaction product can be filtered and subjected to vacuum and moderate temperature, e.g., 30° C. to 50° C., to remove volatiles by evaporation as by rotary evaporation. The reactants are advantageously mixed on a mole for mole basis and, if desired, suitable solvents can be used.

The reaction with the hydrocarbyl halide does not require a special catalyst and need not be carried out in a solvent, although it is advantageous to dissolve both the siloxane and the halide in about 40 to about 100 wt. percent of a polar solvent, e.g., alcohols or ethers. Atmospheric or super-atmospheric pressures can be used. The reactants preferably are mixed on a mole for mole basis. Moderate temperatures, e.g., 40 to 80° C., can be used. All reactants and solvent can be mixed at once and maintained at the reaction temperature or they may be added in any desired order. The product can be separated in any convenient manner, e.g., vacuum rotary evaporation. Purification, as by washing with inert solvents, can be carried out if desired.

Cationic silicone surfactants and methods of preparing them are disclosed in U.S. application Ser. No. 887,428 entitled "Cationic Silicones" by Bela Prokai, said application having been filed concurrently herewith.

The cationic silicone surfactant is preferably employed in this invention in amounts of from 0.15 to 4.0 parts by weight per 100 parts by weight of the total weight of the polyester and the polyisocyanate.

The catalysts employed in this invention include the conventional catalysts used in producing flexible polyester urethane foams. Such conventional catalysts include N-methyl morpholine, N-ethyl morpholine, hexadecyl dimethylamine, dimethylbenzylamine, N - cocomorpholine, triethylene diamine[1,4 - diazobicyclo(2,2,2) - octane], a mixture of 70 wt. percent bis(2-dimethylaminoethyl) ether and 30 wt. percent dipropylene glycol, a mixture of 20 wt. percent Tergitol NPX, 40 wt. percent $Me_3SiO(Me_2SiO)_5[MeO(C_2H_4O)_7C_3H_6SiMeO]_7SiMe_3$ and 40 wt. percent bis(2-dimethylaminoethyl) ether, and the like. Such catalysts are preferably employed in the mixtures in an amount from 0.1 to 0.5 or 2 weight percent based on the total weight of the polyester and the polyisocyanate. Amines are the preferred catalysts.

The polyesters employed in this invention are the reaction products of polyfunctional organic carboxylic acids and polyhydric alcohols. The polyesters contain at least two hydroxyl groups per molecule (as alcoholic OH or as OH in COOH groups). The functionality of these acids is preferably provided by carboxy groups (COOH) or by both carboxy groups and alcoholic hydroxyl groups. The polyesters can have hydroxyl numbers from 45 to 150 but preferably have hydroxyl numbers from 45 to 65. These hydroxyl numbers are readily determined according to the procedure described by Mitchel et al., Organic Analysis, volume I, Interscience, New York, 1953. The polyesters can be free of aliphatic carbon to carbon multiple bonds (i.e., olefinic double bonds or acetylenic triple bonds).

Typical of the polyfunctional organic carboxylic acids that can be employed in producing polyesters useful in this invention are dicarboxylic aliphatic acids, such as, succinic, adipic, sebacic, azelaic, glutaric, pimelic and suberic acids and aromatic dicarboxylic acids, such as, phthalic acid, terephthalic acid, isophthalic acid and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the polyesters.

Typical of the polyhydric alcohols ("polyols") that can be employed in producing the polyesters useful in this invention are both the monomeric polyhydric alcohols (such as, glycerol, 1,2,6-hexanetriol, ethylene glycol, trimethylol propane, trimethylolethane, pentaerythritol, propylene glycol, 1,3-butylene glycol and 1,4-butylene glycol) and the polymeric polyhydric alcohols such as those described below.

The polymeric polyhydric alcohols employed in producing the polyesters used in this invention include the linear and branched chain polyethers which have a plurality of acyclic ether oxygens and contain at least two alcoholic hydroxyl radicals. Illustrative polyethers include the polyoxyalkylene polyols containing one or more chains of connected oxyalkylene radicals which are prepared by the reaction of one or more alkylene oxides with a acyclic and alicyclic polyols. Examples of the polyoxyalkylene polyols include the polyoxyethylene glycols prepared by the addition of ethylene oxide to water, ethylene glycol or dipropylene glycol; polyoxypropylene glycols prepared by the addition of propylene oxide to water, propylene glycol or dipropylene glycol; mixed oxyethyleneoxypropylene polyglycols prepared in a similar manner utilizing a mixture of ethylene oxide and propylene oxide or a sequential addition of ethylene oxide and propylene oxide; and the polyoxybutylene glycols and copolymers such as polyoxyethyleneoxybutylene glycols and polyoxypropyleneoxybutylene glycols. Included in the term "polyoxybutylene glycols" are polymers and copolymers of 1,2-butylene oxide, 2,3-butylene oxide and 1,4-butylene oxide.

Other acyclic and alicyclic polyols which can be reacted with ethylene oxide, propylene oxide, butylene oxide or mixtures thereof to provide polyethers that are useful in producing polyesters used in this invention include glycerol, trimethylolpropane, 1,2,6-hexanetriol, pentaerythritol, sorbitol, glycosides, such as, methyl, ethyl, propyl, butyl and 2-ethylhexyl arabinoside, xyloside, fructoside, glucoside and rhamnoside, and polyethers prepared by the reaction of alkylene oxides with sucrose.

Further polyethers that are useful in producing polyesters that can be used in this invention are prepared by reacting a 1,2-alkylene oxide, such as, ethylene oxide, propylene oxide, butylene oxide or mixtures thereof with mononuclear polyhydroxybenzenes, such as, resorcinol, pyrogallol, phloroglucinol, hydroquinone, 4,6-di-t.-butylcatechol or catechol. Other polyethers which can be employed in producing polyesters than can be used in this invention are those obtained by reacting 1,2-alkylene oxides or mixtures thereof with polynuclear hydroxybenzenes such as the various di, tri- and tetraphenylol compounds in which two to four hydroxybenzene groups are attached by means of single bonds or by an aliphatic hydrocarbon radical containing one to twelve carbon atoms. The term "polynuclear" as distinguished from "mononuclear" is used to designate at least two benzene nuclei in a compound. Exemplary diphenylol compounds include 2,2-bis(p - hydroxyphenyl)-propane; bis(p-hydroxyphenyl)-methane and the various diphenols and diphenol methanes disclosed in U.S. Pats. Nos. 2,506,486 and 2,744,882, respectively. Tetraphenylol compounds can also be reacted with 1,2-alkylene oxides to produce polyethers that are useful in producing polyesters that can be used in this invention. Other polyethers which can be employed in producing polyesters that can be used in this invention are the ethylene oxide, propylene oxide and butylene oxide adducts of phenolformaldehyde condensation product materials such as the novolaks.

A variety of organic polyisocyanates can be employed in this invention for reaction with the polyesters above described to provide flexible polyester urethane foams. Preferred are polyisocyanates having the general formula:

$$Q(NCO)_i$$

wherein $i$ is an integer of two or more and Q is an organic radical having the valence of $i$. Q can be a substituted or unsubstituted hydrocarbon group (e.g., an alkylene or an arylene group). Q can be a group having the formula Q'—Z—Q' where Q' is an alkylene or arylene group and Z is —O—, —O—Q'—, —CO—, —S—, —S—Q'—S—, or —SO$_2$—. Examples of such compounds include hexamethylene diisocyanate, 1,8 - diisocyanato-p-menthane, xylylene diisocyanate, (OCNCH$_2$CH$_2$CH$_2$OCH$_2$)$_2$O, 1-methyl-2,4-diisocyanatocyclohexane, phenylene diisocyanates, tolylene diisocyanates, chlorophenylene diisocyanates, diphenylmethane - 4,4' - diisocyanate, naphthalene-1,5 - diisocyanate, triphenylmethane-4,4',4''-triisocyanate, and isopropylbenzene-alpha-4-diisocyanate. Further included among the isocyanates useful in this invention are dimers and trimers of isocyanates and diisocyanates and polymeric diisocyanates such as those having the general formula:

$$[Q(NCO)_i]_j$$

in which $i$ and $j$ are integers of two or more, as well as (as additional components in the reaction mixtures) compounds of the general formula:

$$L(NCO)_i$$

in which $i$ is one or more and L is a monofunctional or polyfunctional atom or radical. Examples of this type include ethylphosphonic diisocyanate, C$_2$H$_5$P(O)(NCO)$_2$; phenylphosphonic diisocyanate, C$_6$H$_5$P(O)(NCO)$_2$, isocyanates derived from sulfonamides (QSO$_2$NCO), cyanic acid, thiocyanic acid, and compounds containing a metal —NCO radical such as tributyltin isocyanate.

The polyisocyanates are preferably employed in this invention in amounts that provide from 90% to 110% of the stoichiometric amount of isocyanato groups required to react with all of the hydroxyl groups of the polyester and with any water present as a blowing agent.

The blowing agents employed in this invention include methylene chloride, water, liquefied gases which have boiling points below 80° F. and above —60° F., or by other inert gases such as, nitrogen, carbon dioxide, methane, helium and argon. Suitable liquefied gases include saturated aliphatic fluorohydrocarbons which vaporize at or below the temperature of the foaming mass. Such gases are at least partially fluorinated and can also be otherwise halogenated. Fluorocarbon blowing agents suitable for use in foaming the formulations of this invention include trichloromonofluoromethane, dichlorodifluoromethane, dichlorofluoromethane, 1,1-chloro-1-fluoroethane, 1-chloro-1,1-difluoro, 2,2-dichloroethane, and 1,1,1-trifluoro, 2-chloro - 2 - fluoro, 3,3-difluoro-4,4,4-trifluorobutane. The amount of blowing agent used will vary with density desired in the foamed product. Usually from 2 to 15 parts by weight of the blowing agent per 100 parts by weight of the polyester are preferred.

Other additional ingredients can be employed in minor amounts in producing polyester urethane foams in accordance with the process of this invention if desired for specific purposes. Thus, inhibitors (e.g., d-tartaric acid and tertiary-butyl pyrocatechol, "Ionol") can be employed to reduce any tendency of the foam to hydrolytic or oxidative instability. Other additives that can be employed are dyes or pigment and anti-yellowing agents.

It is often convenient to provide premixtures of the cationic silicone surfactant, inhibitors, solubilizers, etc. Such premixtures provide convenience in preparing the reaction mixture used in producing the polyester urethane foams according to this invention.

In accordance with this invention, flexible polyester urethane foams are produced by a one-step or one-shot technique wherein all of the reactants are reacted simultaneously with the foaming operation. The foaming and the urethane-forming reaction occur without the application of external heat. Thereafter, the foam can be heated (further cured) at 110° F. to 140° F. for 10 to 20 minutes to eliminate any surface tackiness, if desired.

The relative amounts of the various components reacted in accordance with the above-described process for producing flexible polyester urethane foams in accordance with this invention are not narrowly critical. The polyester and the polyisocyanate are present in the foam formulations used to produce such foams in a major amount. The relative amounts of these two components is the amount required to produce the urethane structure of the foam and such relative amounts are well known in the art. The blowing agent, catalyst and surfactants are each present in a minor amount necessary to achieve the function of the component. Thus, the blowing agent is present in a minor amount sufficient to foam the reaction mixture, the catalyst is present in a catalytic amount (i.e., an amount sufficient to catalyze the reaction to produce the urethane at a reasonable rate) and the surfactants are present in a foam-stabilizing amount (i.e., in an amount sufficient to stabilize the foam). Preferred amounts of these various components are given hereinabove.

The low density flexible polyester urethane foams produced in accordance with this invention have improved cell structure, i.e., the cells are fine and uniform.

The flexible polyester urethane foams produced in accordance with this invention can be used in the same areas and for the same purpose as conventional flexible polyester urethane foams (e.g., they can be used as cushioning materials for seating or for packaging delicate objects, as gasketing material and as textile interliners having densities from 1.4 to 1.6 pounds per cubic foot).

The following examples are presented. Unless otherwise specified, parts and percentages are on a weight basis and temperatures are on the centigrade scale. Rise designates the foam height and CPI denotes the number of cells per linear inch of foam and is proportional to the fineness of the foam. The following designations are used to denote various surfactants employed in the examples for comparison purposes.

| Designation | Surfactant |
|---|---|
| C-1 | Reaction product of oleic acid and diethyl amine, sold under the name "Mobay A-3." |
| C-2 | Sulfated or sulfonated ester produced by reacting propylene oxide and ethylene oxide with a fatty acid to produce an ester and then sulfating or sulfonating the ester, sold under the name of "Witco Fomrez 77-86." |
| C-3 | Mixture containing: (1) 35% $Me_3SiO(Me_2SiO)_{5.1}[Me(OC_2H_4)_{7.2}OC_3H_6SiMeO]_{7.5}SiMe_3$; (2) 35% Sodium sulfonate of a petroleum hydrocarbon mixture having an average molecular weight of 435 and sold under the tradename of "Bryton 430"; (3) 15% tall oil; (4) 15% hexylene glycol; (5) 2,500 parts Ionol per million parts of (1) to (4). |
| TDI [1] | Mixture of 80 wt. percent 2,4-tolylene diisocyanate and 20 wt. percent 2,6-tolylene diisocyanate. Index 105 means the amount of TDI used was 105% of the stoichiometric amount required to react with the polyester and water present in the formulation. |

[1] Index 105.

Also, in the examples

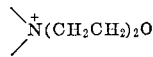

designates the morpholinium group and

designates the piperidinium group.

EXAMPLES 1–24

Several foams were prepared by using the following formulation:

| Ingredient: | Parts |
|---|---|
| Polyester I | 100 |
| N-ethyl morpholine (catalyst) | 1.9 |
| Hexadecyl dimethylamine (catalyst) | 0.3 |
| Surfactant (see table) | (1) |
| Water | 3.6 |
| TDI (Index 105) | 45.2 |

[1] Listed in Table 1.

All foams were prepared in the following manner. The polyester was weighed into a tared container. The surfactant under study, amine catalysts and water were mixed in a 4-ounce jar. The TDI was then mixed with the polyester using a spatula. Further mixing was done in a drill press equipped with two three-bladed marine-type propellers about two inches in diameter and having a

TABLE 1

| Example type | Example No. | Surfactant identification | Parts surfactant | Rise (Inches) | Character of foam* |
|---|---|---|---|---|---|
| Comparison | 1 | C-1 | 1.3 | Collapse | |
|  |  | C-2 | 1.4 | | |
|  | 2 | C-3 | 1 | 5.4 | a |
|  | 3 | $Me_3SiO(Me_2SiO)_5[MeO(C_2H_4O)_7C_3H_6SiMeO]_7SiMe_3$ | 1 | 4.8 | b |
|  | 4 | $[(Me_3SiO)_2MeSi(CH_2)_3OCH_2CH(OH)CH_2SO_3^-]Na^+$ | 1 | Collapse | |
| Invention | 5 | $[(Me_3SiO)_2MeSi(CH_2)_3\overset{+}{N}Me_3]I^-$ | 1 | 5.7 | a |
|  | 6 | Same as above | 0.5 | 5.1 | b |
|  | 7 | $[(Me_3SiO)_2MeSi(CH_2)_3(Me)\overset{+}{N}C_5H_{10}]I^-$ | 1 | 5.5 | a |
|  | 8 | $[(Me_3SiO)_2MeSi(CH_2)_3OCH_2CH(OH)CH_2(Me)\overset{+}{N}(CH_2CH_2)_2O]I^-$ | 1 | 6.1 | a |
|  | 9 | Same as above | 0.5 | 5.7 | b |
|  | 10 | $[(Me_3SiO)_2MeSi(CH_2)_3OCHMeCH_2(Me)\overset{+}{N}(CH_2CH_2)_2O]I^-$ | 1 | 5.3 | a |
|  | 11 | $[(Me_3SiO)_2MeSi(CH_2)_3\overset{+}{N}Et_3]I^-$ | 1 | 5.4 | c |
|  | 12 | $[(Me_3SiO)_2MeSi(CH_2)_3\overset{+}{N}Et_2Me]I^-$ | 1 | 5.0 | b |
| Comparison | 13 | $[(Me_3SiO)_2MeSi(CH_2)_3(Me)\overset{+}{N}(CH_2CH_2)_2O]I^-$ | 1 | 2.3 | b |
|  | 14 | $[(Me_3SiO)_2MeSi(CH_2)_3(Me)\overset{+}{N}(CH_2CH_2)_2O]Br^-$ | 1 | Collapse | |
|  | 15 | $Me_3SiO(Me_2SiO)_{3.1}[I^-(OCH_2CH_2)_2\overset{+}{N}(Me)(CH_2)_3SiMeO]_{6.8}SiMe_3$ | 1 | 4.4 | c |
|  | 16 | $Me_3SiO(Me_2SiO)_{7.1}[I^-(OCH_2CH_2)_2\overset{+}{N}(Me)(CH_2)_3SiMeO]_{3.4}SiMe_3$ | 1 | Collapse | |
|  | 17 | $[Me_3SiO)_2MeSiO(CH_2)_3(Me)\overset{+}{N}(CH_2CH_2)_2O]I^-$ | 1 | 4.9 | c |
|  | 18 | $[(Me_3SiO)_2MeSiOCHMeCH_2(Me)\overset{+}{N}(CH_2CH_2)_2O]I^-$ | 1 | Collapse | |
|  | 19 | $[(Me_3SiO)_2MeSiOCHMeCH_2(Me)\overset{+}{N}(CH_2CH_2)_2O]Br^-$ | 1 | 3.0 | d |
|  | 20 | $Me_3SiO(Me_2SiO)_5[I^-(OCH_2CH_2)_2\overset{+}{N}(Me)CH_2CHMeOSiMeO)]_5SiMe_3$ | 1 | Collapse | |
|  | 21 | $Me_3SiO(Me_2SiO)_8[I^-(OCH_2CH_2)_2\overset{+}{N}(Me)CH_2CHMeOSiMeO)]_2SiMe_3$ | 1 | 2 | d |
|  | 22 | $Me_3SiO(Me_2SiO)_5[Na\overset{+}{S}O_3^-CH_2CH(OH)CH_2O(CH_2)_3SiMeO]_4SiMe_3$ | 1 | Collapse | |
|  | 23 | $Me_3SiO(Me_2SiO)_5[Na\overset{+}{S}O_3^-CH_2CH(OH)CH_2O(CH_2)_3SiMeO]_{1.5}SiMe_3$ | 1 | Collapse | |
|  | 24 | $Me_3SiO(Me_2SiO)_5[Na\overset{+}{S}O_3^-CH_2CH(OH)CH_2O(CH_2)_3SiMeO]_2SiMe_3$ | 1 | Collapse | |

*Character of foam: a—Breatheable foam, good cell structure; b—Slightly tight foam; c—Sea sponge like structure; d—Foam shrank; e—Foam shrank slightly and the foam was tight also.

45° pitch. The mixing in the drill press was accomplished at 1000 revolutions per minute for 8 seconds. Then the contents of the jar were added. The reaction mixture so produced was mixed for 7 seconds and was then poured into a container. In all cases, the foam formulations foamed and reacted spontaneously and simultaneously. The foams were further cured for 30 minutes at 130° C. The properties of the foam were observed and are given in Table 1.

EXAMPLES 25 AND 26

Two more foams were prepared from the following formulation:

| Ingredient: | Parts |
|---|---|
| Polyester I | 100 |
| N-ethylmorpholine (catalyst) | 1.9 |
| Hexadecyl dimethylamine (catalyst) | 0.3 |
| Surfactant (see Table 2) [1] | |
| Water | 5.0 |
| TDI (Index 105) | 59.4 |
| | 166.6 |

[1] Listed in Table 1.

The foams were prepared in the manner described in Examples 1–24. The properties of the resulting foams were observed and are given in Table 2.

consisting of a piperidinium group and a morpholinium group, in which N is bonded to the remaining R group, with the proviso that when the divalent heterocyclic ring is a morpholinium group said R° group is selected from the class consisting of said hydroxy-substituted divalent hydrocarbon groups and —R″OR″— groups, and with the proviso that when the divalent heterocyclic ring is not a morpholinium group said R° group represents only said divalent hydrocarbon groups; and X is halogen selected from the class consisting of chlorine, bromine and iodine.

2. Process as claimed in claim 1 wherein the cationic silicone surfactant has the Formula 1 given in claim 1 wherein R° is selected from the class consisting of alkylene, alkyleneoxyalkylene and hydroxy-substituted alkyleneoxyalkylene and R is selected from the class consisting of monovalent hydrocarbon groups free of aliphatic unsaturation and having 1 to 18 carbon atoms when taken individually and a morpholinium group and a piperidinium group when two R groups are taken together with the N atom as defined in claim 1.

3. Process as claimed in claim 2 wherein the cationic silicone surfactant has the formula:

$$[(Me_3SiO)_2MeSi(CH_2)_3\overset{+}{N}Me_3]I^-$$

TABLE 2

| Example type | Example No. | Surfactant identification | Parts surfactant | Rise (inches) | Character of foam* |
|---|---|---|---|---|---|
| Invention | 25 | $[(Me_3SiO)_2MeSi(CH_2)_3OCH_2CH(OH)CH_2(Me)\overset{+}{N}(CH_2CH_2)_2O]I^-$ | 1 | 7.2 | b |
| Comparison | 26 | C-1 | 1.3 | 5.1 | e |
| | | C-2 | 1.4 | | |

*See footnote to Table 1.

What is claimed is:

1. A process for producing a flexible polyester urethane foam, said process comprising foaming and reacting in a single step a reaction mixture comprising:
   (I) a polyester resin having an average of at least two hydroxyl groups per molecule and having a hydroxyl number of from 45 to 150;
   (II) a polyisocyanate, said polyester and said polyisocyanate, taken together, being present in the mixture in a major amount and in the relative amounts required to produce the urethane;
   (III) a blowing agent in a minor amount sufficient to foam the reaction mixture;
   (IV) a catalytic amount of a catalyst for the production of the urethane from the polyester and the polyisocyanate;
   (V) a minor amount of a cationic silicone surfactant of the formula:

$$MD_xM \quad (a)$$

wherein M is the trimethylsiloxy unit, $Me_3SiO_{1/2}$, $x$ is an integer of 1 to 3, and D is a cationic difunctional siloxy unit of the formula:

$$X^-[R_3\overset{+}{N}R°Si(Me)O] \quad (1)$$

wherein R° is a divalent organic group free of aliphatic unsaturation and having 2 to 18 carbon atoms and is selected from the class consisting of divalent hydrocarbon groups, hydroxy-substituted divalent hydrocarbon groups and —R″OR″— groups wherein R″ is selected from the class consisting of divalent hydrocarbon groups and hydroxy-substituted divalent hydrocarbon groups and may be the same or different in each occurrence; R is selected from the class consisting of a monovalent hydrocarbon group when taken individually, and when two R groups are taken together with N of said formula, a divalent heterocyclic ring selected from the class 4. Process as claimed in claim 2 wherein the cationic silicone surfactant has the formula:

$$[(Me_3SiO)_2MeSi(CH_2)_3(Me)\overset{+}{N}C_5H_{10}]I^-$$

5. Process as claimed in claim 2 wherein the cationic silicone surfactant has the formula:

$$[(Me_3SiO)_2MeSi(CH_2)_3O\,CH_2CH(OH)\,CH_2(Me)\overset{+}{N}(CH_2CH_2)_2O]I^-$$

6. Process as claimed in claim 2 wherein the cationic silicone surfactant has the formula:

$$[(Me_3SiO)_2MeSi(CH_2)_3O\,CHMeCH_2(Me)\overset{+}{N}(CH_2CH_2)_2O]I^-$$

7. Process as claimed in claim 2 wherein the cationic silicone surfactant has the formula:

$$[(Me_3SiO)_2MeSi(CH_2)_3\overset{+}{N}Et_3]I^-$$

8. Process as claimed in claim 2 wherein the cationic silicone surfactant has the formula:

$$[(Me_3SiO)_2MeSi(CH_2)_3\overset{+}{N}Et_2Me]I^-$$

9. Process as claimed in claim 1 wherein said blowing agent is water.

10. Process as claimed in claim 1 wherein said blowing agent is present in an amount sufficient to produce a low density of below 2.0 pounds per cubic foot.

11. Process as claimed in claim 1 wherein said polyester resin is free of aliphatic unsaturation, said polyisocyanate is tolylene diisocyanate, and said catalyst is an amine catalyst.

References Cited

UNITED STATES PATENTS 3,278,465   10/1966   Twitchett _____ 260—2.5

DONALD E. CZAJA, Primary Examiner

C. W. IVY, Assistant Examiner

U.S. Cl. X.R.

260—2.5 AN, 2.5 BB